(12) United States Patent
Patton, Jr.

(10) Patent No.: US 9,064,411 B1
(45) Date of Patent: Jun. 23, 2015

(54) TRAFFIC LIGHT ILLUMINATION DURATION INDICATOR

(71) Applicant: Hezekiah Patton, Jr., Shelby, MS (US)

(72) Inventor: Hezekiah Patton, Jr., Shelby, MS (US)

(*) Notice: Subject to any disclaimer, the term of this patent is extended or adjusted under 35 U.S.C. 154(b) by 0 days.

(21) Appl. No.: 13/778,562

(22) Filed: Feb. 27, 2013

(51) Int. Cl.
*G08G 1/096* (2006.01)
*G08B 5/00* (2006.01)
*G08B 5/22* (2006.01)
*G09F 5/00* (2006.01)
*B60R 1/12* (2006.01)
*G09F 9/33* (2006.01)
*G08G 1/095* (2006.01)

(52) U.S. Cl.
CPC *G08G 1/096* (2013.01); *B60R 1/12* (2013.01); *G09F 9/33* (2013.01); *G08G 1/095* (2013.01)

(58) Field of Classification Search
CPC ..... G08G 1/095; G08G 1/096; G08G 1/0965; G08G 1/096716; G08G 1/096758; G08G 1/096783; G08G 1/0175; G09F 9/33; B60R 1/12
USPC ................. 340/928, 929, 907, 815.4, 815.45; 701/93, 117
See application file for complete search history.

(56) References Cited

U.S. PATENT DOCUMENTS

| | | | | | |
|---|---|---|---|---|---|
| 3,772,874 | A | * | 11/1973 | Lefkowitz | 368/242 |
| 5,150,116 | A | * | 9/1992 | West | 340/928 |
| 5,519,390 | A | * | 5/1996 | Casini | 340/929 |
| 5,726,648 | A | * | 3/1998 | Soon | 340/929 |
| 5,898,645 | A | * | 4/1999 | Sugiyama | 368/82 |
| 6,087,962 | A | * | 7/2000 | Rojas | 340/907 |
| 6,175,313 | B1 | * | 1/2001 | Berezovsky | 340/929 |
| 6,268,805 | B1 | * | 7/2001 | Simon | 340/907 |
| 6,310,562 | B1 | * | 10/2001 | Safronov et al. | 340/929 |
| 6,331,824 | B1 | * | 12/2001 | Firestone | 340/929 |
| 6,335,692 | B1 | * | 1/2002 | Compton | 340/815.4 |
| 6,552,668 | B1 | * | 4/2003 | Berezovsky | 340/929 |
| 6,822,581 | B2 | * | 11/2004 | Chaffe | 340/907 |
| 7,167,106 | B2 | * | 1/2007 | Haase | 340/909 |
| 7,187,301 | B2 | * | 3/2007 | Lu | 340/929 |
| RE40,737 | E | * | 6/2009 | Firestone | 340/929 |
| 7,884,738 | B2 | * | 2/2011 | Pappas et al. | 340/906 |
| 8,078,379 | B2 | * | 12/2011 | Lu | 701/93 |
| 8,892,342 | B2 | * | 11/2014 | Yamada et al. | 701/117 |
| 2002/0005790 | A1 | * | 1/2002 | Georgalis | 340/929 |
| 2002/0097167 | A1 | * | 7/2002 | Bourgault | 340/929 |
| 2003/0137428 | A1 | * | 7/2003 | Hutchison | 340/815.45 |
| 2004/0189491 | A1 | * | 9/2004 | Aydin | 340/925 |
| 2006/0092044 | A1 | * | 5/2006 | Naljotov | 340/907 |
| 2006/0197684 | A1 | * | 9/2006 | Tremblay | 340/909 |
| 2007/0176791 | A1 | * | 8/2007 | Bolotin et al. | 340/929 |
| 2007/0257817 | A1 | * | 11/2007 | Mahoney | 340/929 |
| 2008/0136671 | A1 | * | 6/2008 | Shen | 340/907 |
| 2008/0253234 | A1 | * | 10/2008 | Rogers | 368/107 |
| 2008/0258933 | A1 | * | 10/2008 | Diba | 340/907 |
| 2008/0272936 | A1 | * | 11/2008 | Kim et al. | 340/929 |
| 2009/0135024 | A1 | * | 5/2009 | Park et al. | 340/929 |
| 2012/0198274 | A1 | * | 8/2012 | Cho et al. | 714/15 |
| 2014/0225752 | A1 | * | 8/2014 | Lee | 340/929 |

* cited by examiner

*Primary Examiner* — Hoi Lau
(74) *Attorney, Agent, or Firm* — Michael I. Kroll

(57) ABSTRACT

A traffic light illumination duration indicator that provides a motor vehicle operator with a visual indicator of the current illuminated light time remaining before the light changes. The visual indicator is a digital display for showing the remaining minutes and seconds before the traffic light changes state between green, amber and red. The visual indicator can also be a clock-like face that either turns on or turns off a plurality of LED's in a hand sweep action indicating the time duration before the traffic light changes from one state to another.

1 Claim, 9 Drawing Sheets

TRAFFIC LIGHT ILLUMINATION DURATION INDICATOR

BACKGROUND OF THE INVENTION

1. Field of the Invention

The present invention relates generally to traffic lights and, more specifically, to traffic light illumination duration indicator that provides a motor vehicle operator with a visual indicator of the current illuminated light time remaining before the light changes.

The visual indicator of the present invention provides for a digital display of the remaining minutes and seconds before the traffic light changes state between green, amber and red.

Furthermore, the instant invention provides for a visual indicator comprising a clock-like face that either turns on or turns off a plurality of LED's in hand sweep action indicating the time duration before the traffic light changes from one state to another.

2. Description of the Prior Art

There are other indicators which provide for traffic light change indicators. While these indicators may be suitable for the purposes for which they where designed, they would not be as suitable for the purposes of the present invention as heretofore described.

It is thus desirable to provide a traffic light illumination duration indicator that provides a digital readout of time in minutes and seconds before the currently illuminated light is cycled off.

It is further desirable to provide a traffic light illumination duration indicator that provides a clock-like face having a plurality of LED's that are turned on or turned off in a synchronized hand sweep action corresponding to the traffic light currently illuminated.

SUMMARY OF THE PRESENT INVENTION

A primary object of the present invention is to provide a traffic light illumination duration indicator providing motor vehicle operators with a visual indicator of the amount of time before the traffic light changes.

Another object of the present invention is to provide a traffic light illumination duration indicator that is mounted approximately next to a traffic light that displays an illuminated indicator of time remaining before the light changes.

Yet another object of the present invention is to provide a traffic light illumination duration indicator having a housing incorporating a bezel with a lens mounted therein and a plurality of LED elements.

Still yet another object of the present invention is to provide a traffic light illumination duration indicator having a traffic light illumination circuit in electrical communication with a spaced away illumination duration timer that digitally displays the time remaining in minutes and seconds before the traffic light changes.

Another object of the present invention is to provide a traffic light illumination duration indicator having a traffic light illumination circuit in electrical communication with a spaced away illumination duration timer that illuminates the plurality of LED's in clock-face sweep-movement indicating the time remaining before the traffic light changes.

Yet another object of the present invention is to provide a traffic light illumination duration indicator having a traffic light illumination circuit in electrical communication with a spaced away illumination duration timer that dims the plurality of LED's in clock-face sweep-movement indicating the time remaining before the traffic light changes.

Still yet another object of the present invention is to provide a traffic light illumination duration indicator having a traffic light illumination circuit in electrical communication with a spaced away illumination duration timer with a plurality of LED's in clock-face sweep-movement indicating the time remaining before the traffic light changes, which may also provide in concert a digital display.

Another object of the present invention is to provide a traffic light illumination duration indicator in electrical communication with a spaced away illumination duration timer that optionally provides for a blinking cycle at the duration of the timer cycle.

Additional objects of the present invention will appear as the description proceeds.

The present invention overcomes the shortcomings of the prior art by providing a traffic light illumination duration indicator that gives a motor vehicle operator a visual indicator of the current illuminated light time remaining before the light changes.

The indicator provides for a digital readout of the minutes and seconds before the light changes and a clock-like face that turns on or turns off a plurality of LED's that serves as indicator of the remaining illuminated time remaining before the light changes.

The visual indicator of the present invention provides for a digital display of the remaining minutes and seconds before the traffic light changes state between green, amber and red. Furthermore, the instant invention provides for a visual indicator comprising a clock-like face that either turns on or turns off a plurality of LED's in hand sweep action indicating the time duration before the traffic light changes from one state to another.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1, shown is an illustrated view of the prior art.

FIG. 2, shown is an illustrative view of the present invention in use.

FIG. 3, shown is a front view of the present invention.

DESCRIPTION OF THE REFERENCED NUMERALS

Figure 1:
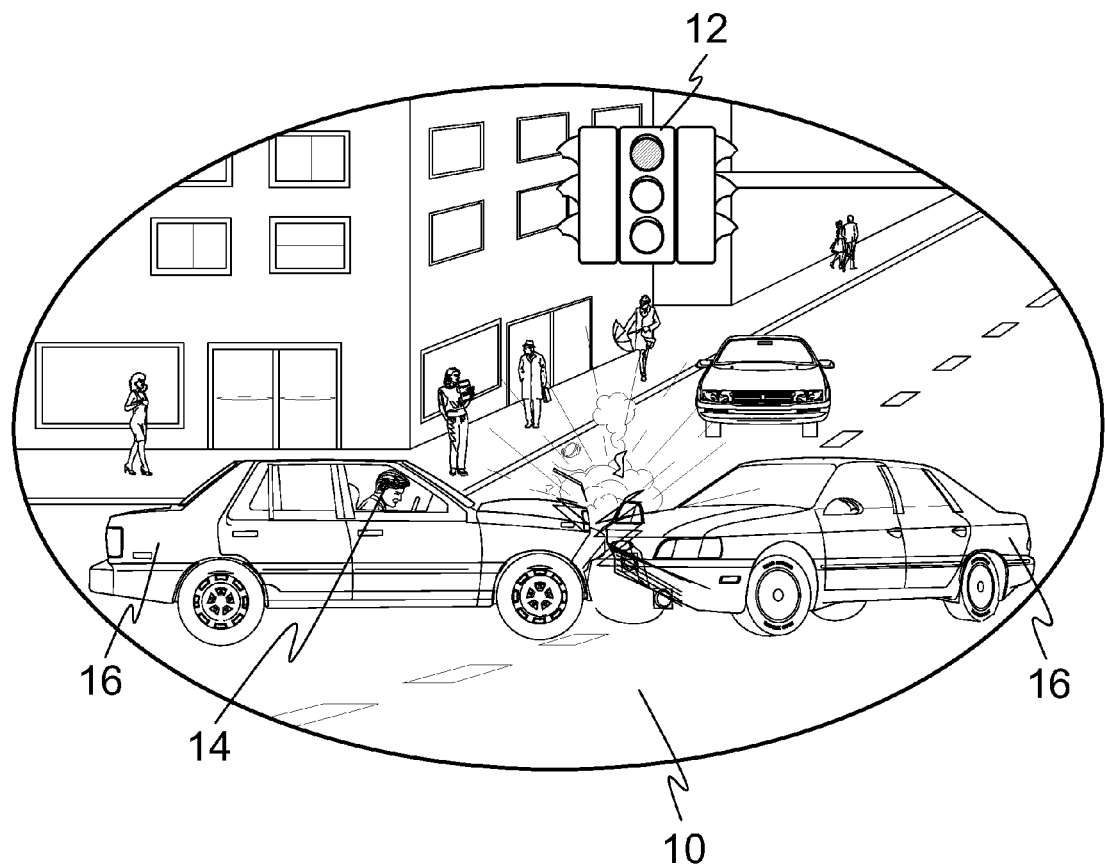

Turning now descriptively to the drawings, in which similar reference characters denotes similar elements throughout the several views, the figures illustrate a traffic light illumination duration indicator of the present invention. With regard to the reference numerals used, the following numbering is used throughout the various drawing figures.
10 intersection
12 traffic light in intersection 10
14 driver of motor vehicle 16
16 motor vehicle
18 traffic light illumination duration indicator
20 visible digital time display of indicator 18
22 traffic light counter device in traffic light 12
24 housing of the display 20
26 digital component of display 20
28 clock-like face for display 20
30 LED in clock-like face 28
32 numeric count down element in clock-like face 28

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrated view of the prior art. Approaching an intersection 10 having traffic lights 12 creates problems for drivers 14 of motor vehicles 16 unaware of how much time they have to proceed across the intersection 10 or wait until the traffic light 12 is in their favor. Many times drivers 14 make the wrong decision and accidents happen. The present invention overcomes this problem by providing a driver 14 visual information of how much time is left between light changes.

Figure 2:
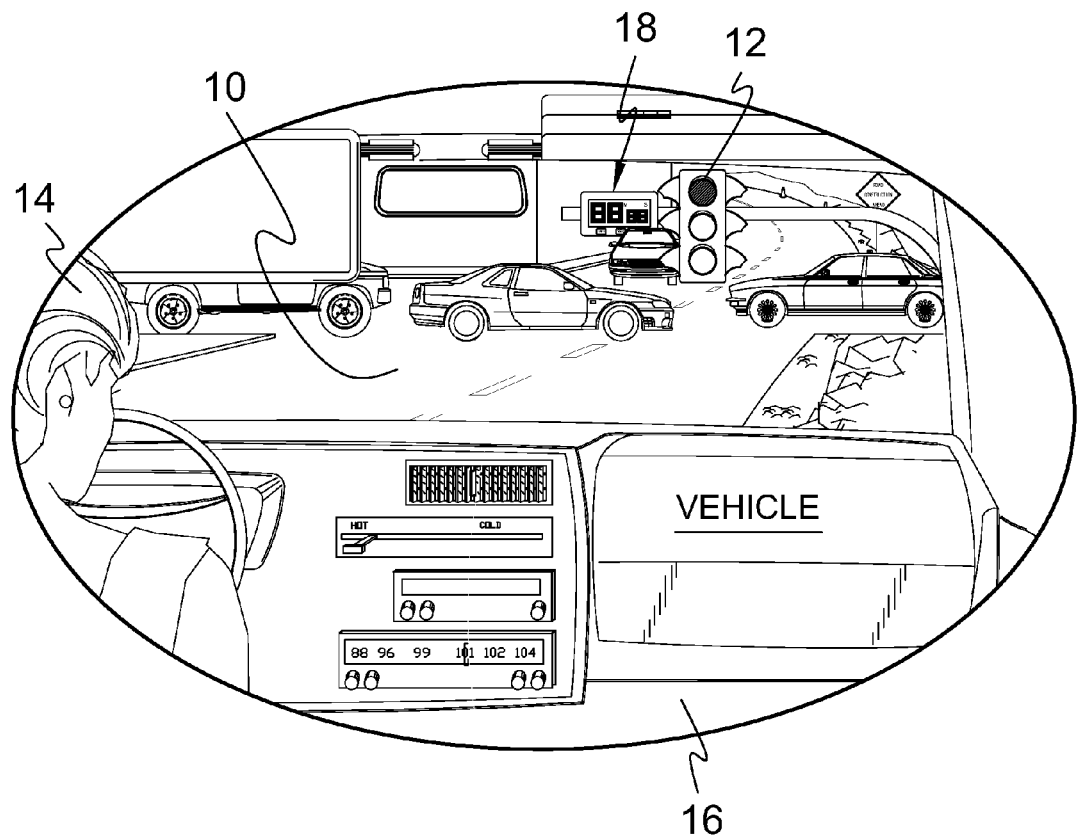

Referring to FIG. 2, shown is an illustrative view of the present invention in use. Shown is an illustration of the present invention, a traffic light illumination duration indicator 18 that will mount along side a traffic light 12 and display time between light changes, informing a driver 14 of a motor vehicle 16, an accurate time between the light changes. The indicator 18 will eliminate traffic violations, decrease the number of fatalities, and enhance better communication between drivers 14 of motor vehicles 16 approaching or stopped at an intersection 10.

Figure 3:
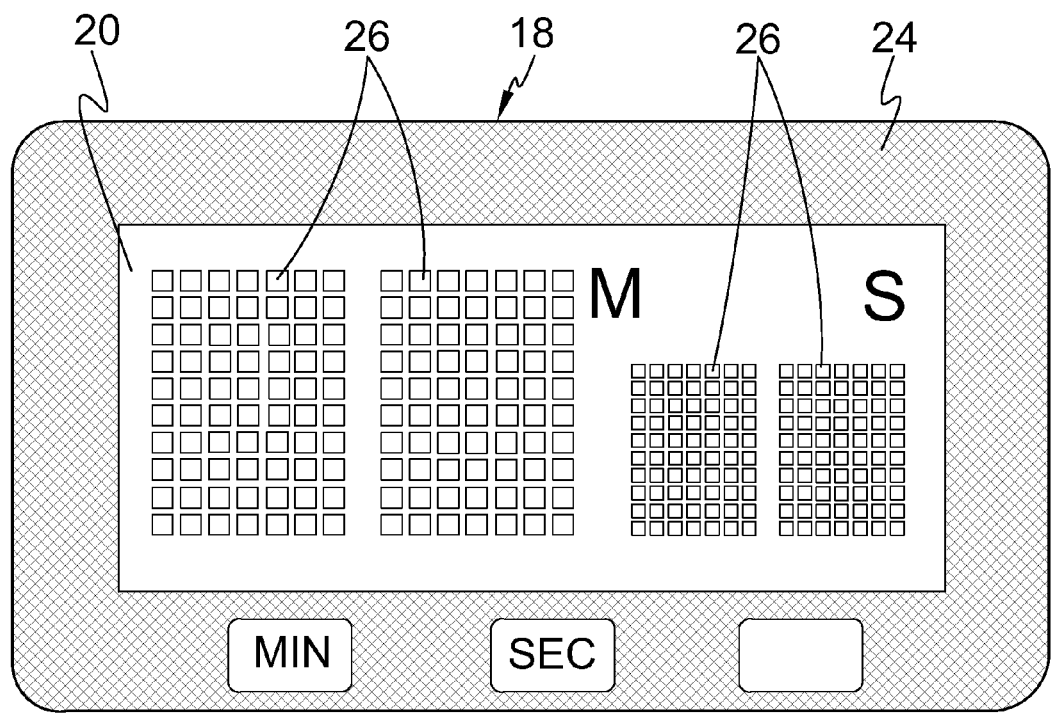

Referring to FIG. 3, shown is a front view of the present invention. The present invention is a traffic light illumination duration indicator 18 having a visible digital time display 20 linked to a traffic light counter device 22. The display 20 comprises a tough, durable, weather resistant housing 24 encapsulating the digital components 26. The indicator 18 will allow drivers 14 at an intersection 10 to know how much time is left between light changes.

Figure 4:
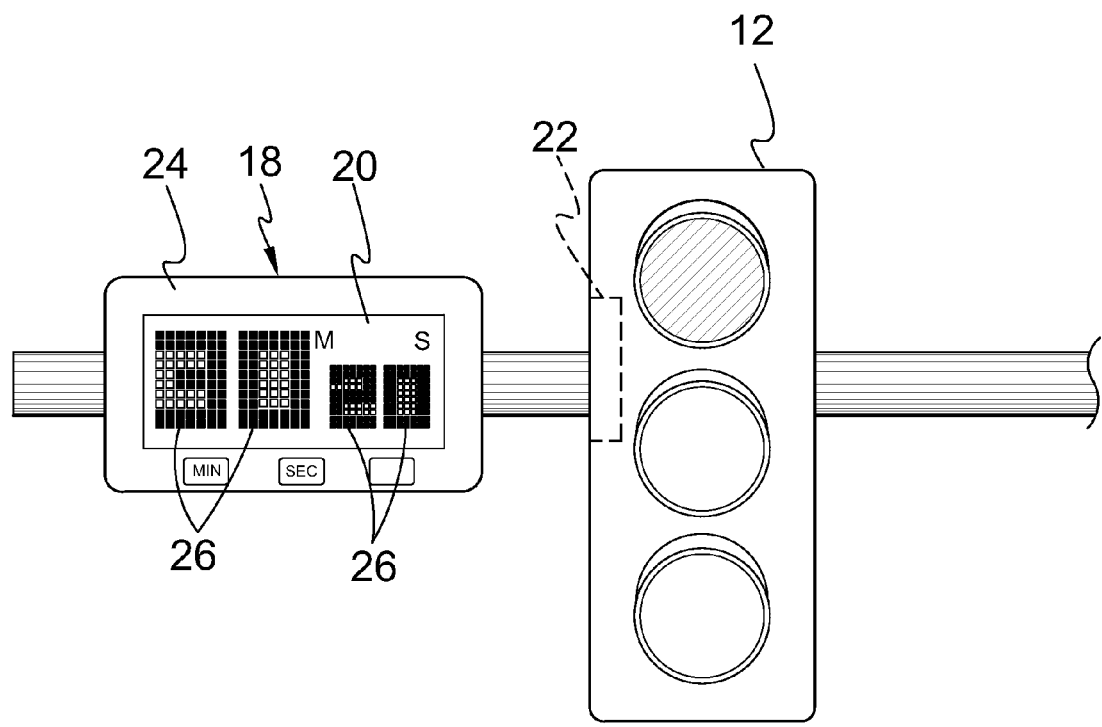
FIG. 4 is an illustrative view of the present invention mounted adjacent to a traffic light.

Referring to FIG. 4, shown is an illustrative view of the present invention mounted adjacent to a traffic light. Shown is a traffic light illumination duration indicator 18 alongside a traffic light 12. The indicator 18 has a visible digital time display 20 linked to a traffic light counter device 22. The display 20 comprises a tough, durable, weather resistant housing 24 encapsulating the digital components 26. The indicator 18 will allow drivers 14 at an intersection 10 to know how much time is left between light changes.

Figure 5:
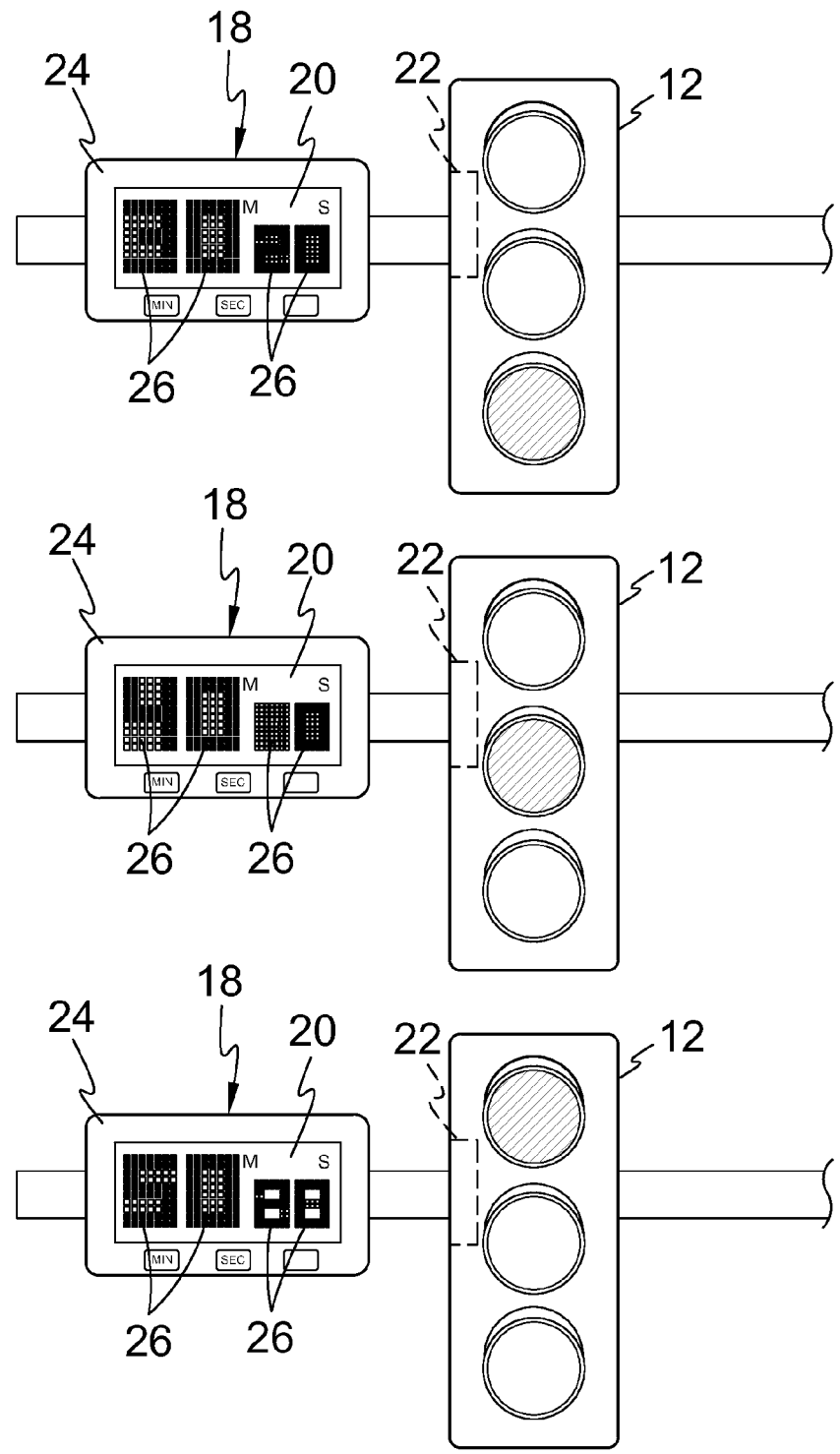
FIG. 5 is an orthographic view of the present invention.

Referring to FIG. 5, shown is an orthographic view of the present invention. Shown is a traffic light illumination duration indicator 18 mounted alongside a traffic light 12. The indicator 18 has a digital time read out in a visible digital time display 20 linked to a traffic light counter device 22. The display 20 comprises a tough, durable, weather resistant housing 24 encapsulating the digital components 26. The indicator 18 will allow drivers 14 at an intersection to know how much time is left between light color changes.

Figure 6:
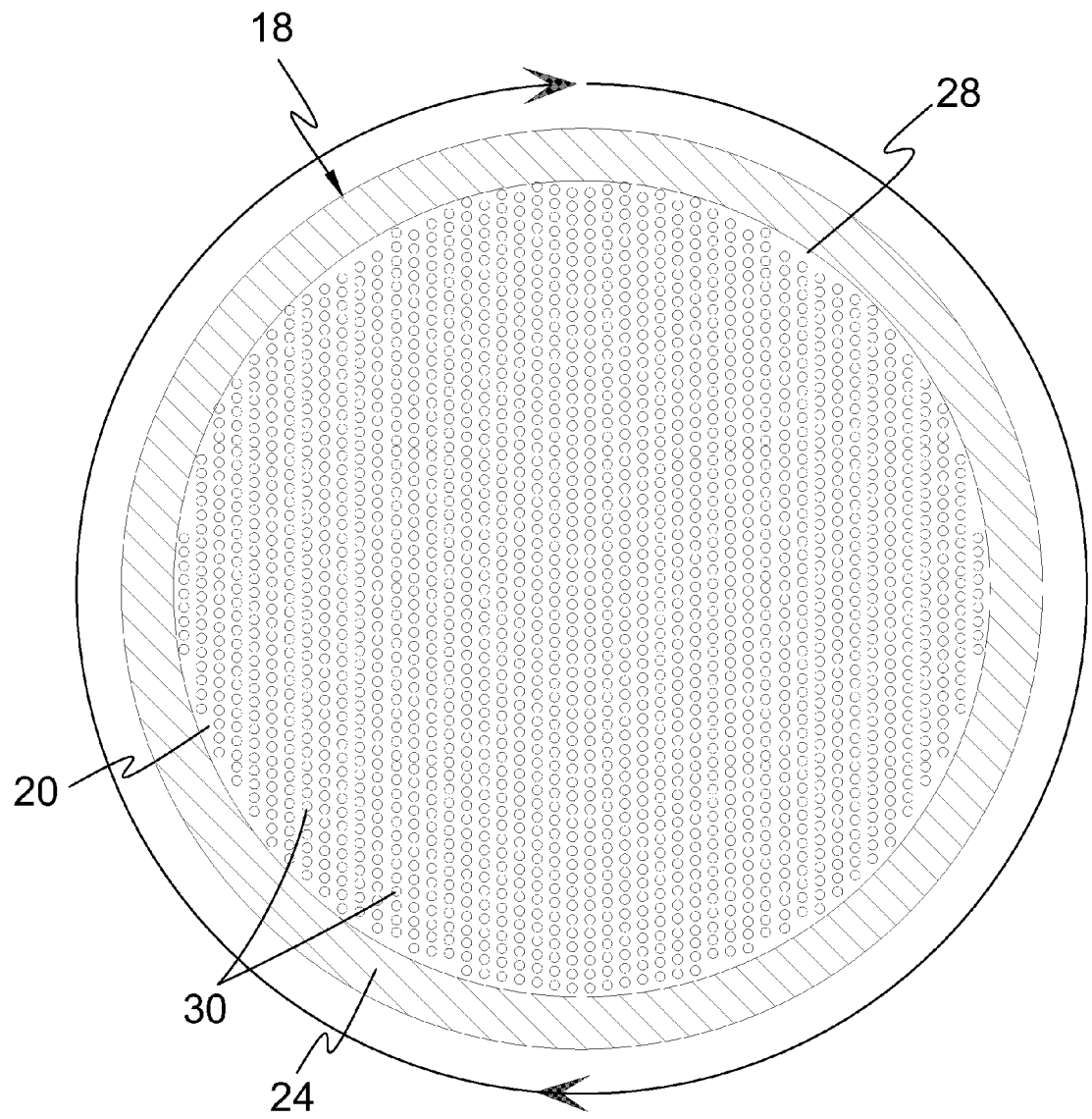
FIG. 6 is a front view of another configuration of the present invention.

Referring to FIG. 6, shown is a front view of another configuration of the present invention. The present invention being a traffic light illumination duration indicator 18 provides a visual digital time display 20 with a clock-like face 28 having a plurality of LED's 30 that illuminate in a progressive sweep, indicating the amount of time until the light changes from green to amber to red. The indicator 18 provides that the plurality of LED's 30 may move from a totally illuminated state to an un-illuminated state or from a totally un-illuminated state to an illuminated state. The indicator 18 having the visual display 20 is linked to a traffic light counter device 22. The display 20 comprises a tough, durable, weather resistant housing 24 encapsulating the LED's 30. The indicator 18 will allow drivers 14 at an intersection 10 to know how much time is left between light changes.

Figure 7:
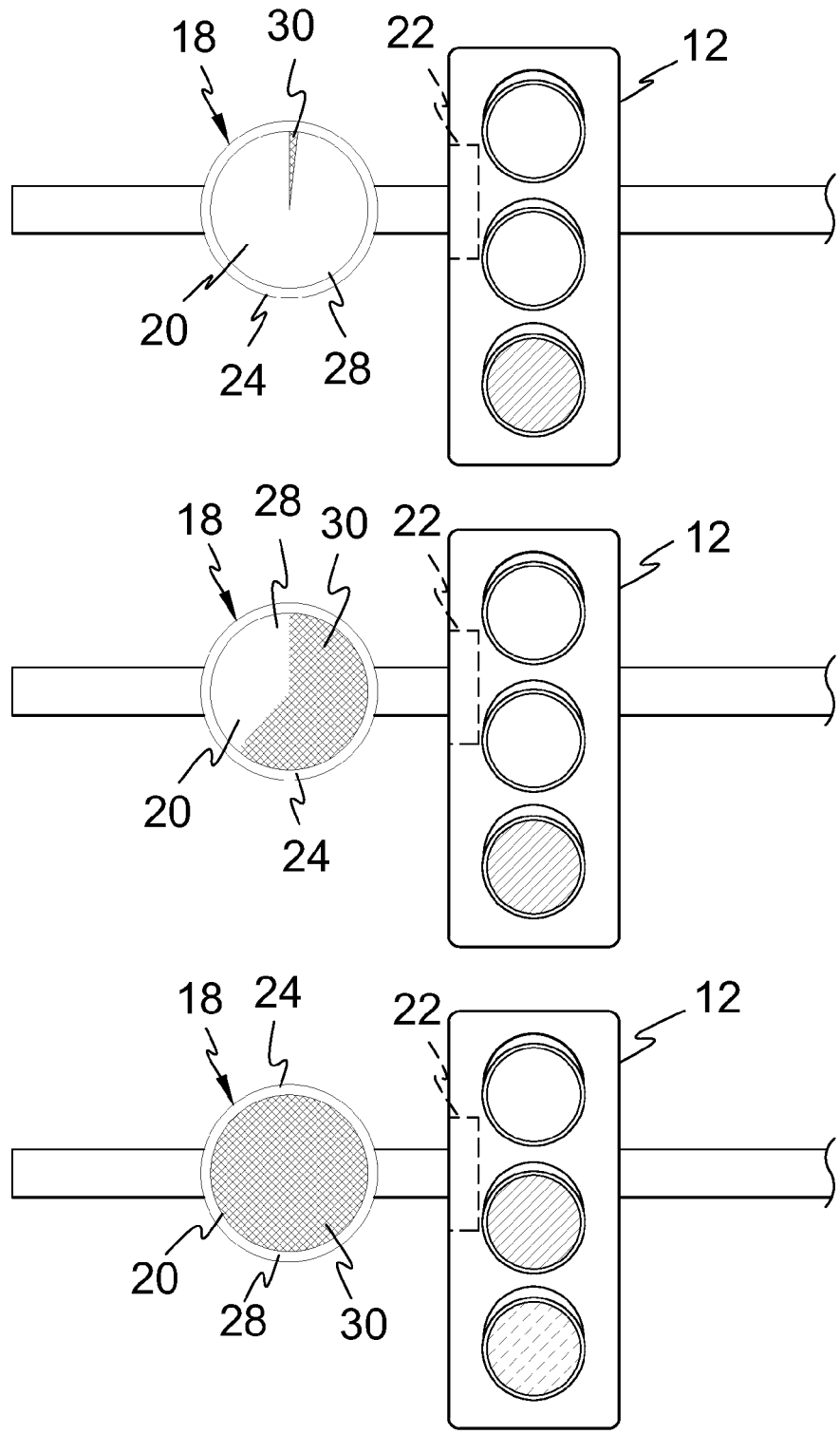
FIG. 7 is an illustrative view of the other configuration showing a green light sequence and progressive illumination of remaining cycle time.

Referring to FIG. 7, shown is an illustrative view of the other configuration showing a green light sequence and progressive illumination of remaining cycle time. Shown is the clock-like face 28 having a progression of illuminating LED's 30 that when fully illuminated or un-illuminated, the green light turns off and the amber light illuminates with the plurality of LED's 30 resetting to an amber timing task. The indicator 18 will allow drivers 14 at an intersection 10 to know how much remaining time is left between light changes.

Figure 8:
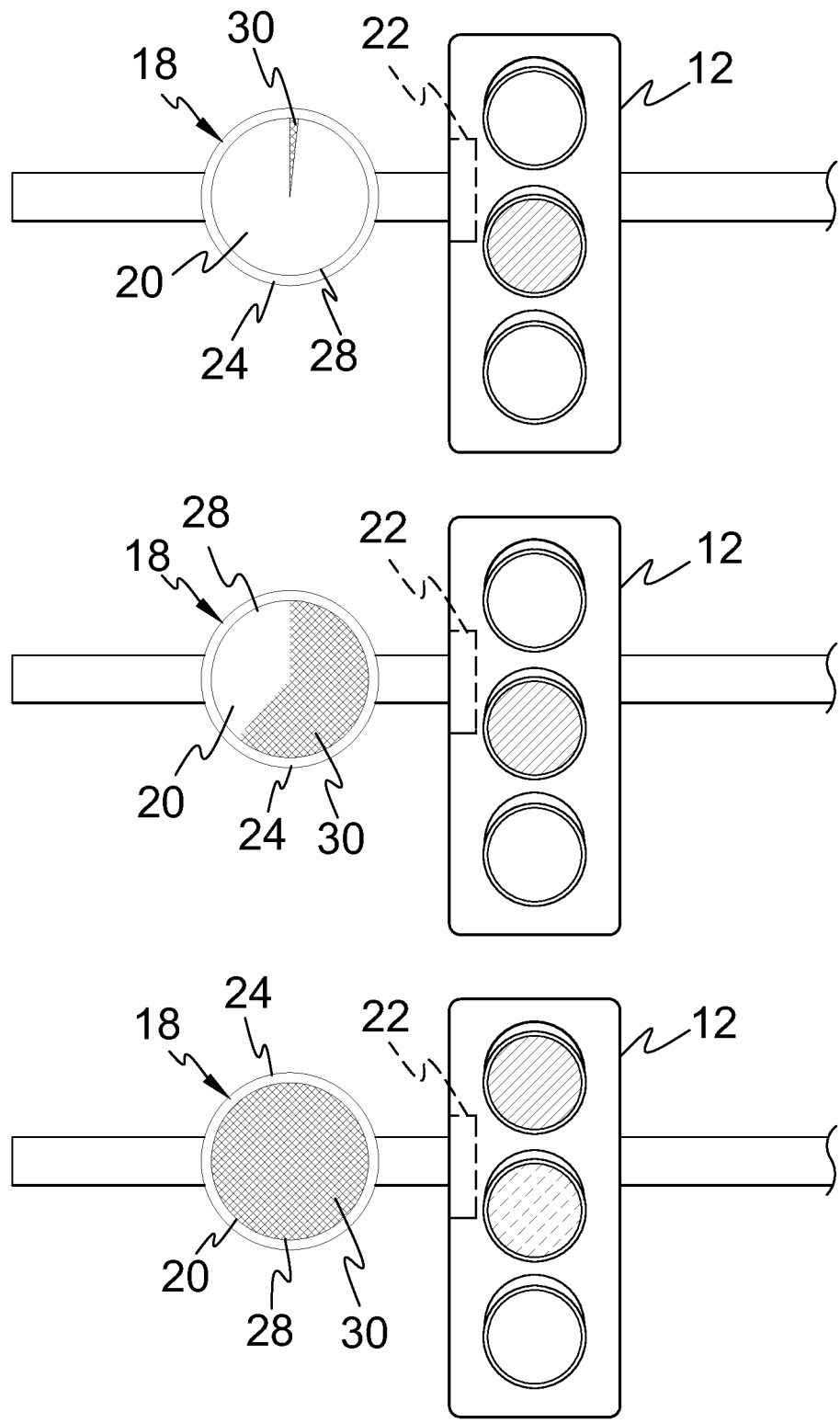
FIG. 8 is an illustrative view of the other configuration showing an amber light sequence and progressive illumination of remaining cycle time.

Referring to FIG. 8, shown is an illustrative view of the other configuration showing an amber light sequence and progressive illumination of remaining cycle time. Shown is the clock-like face 28 having a progression of illuminating LED's 30 that when fully illuminated or un-illuminated provides a visual indicator during a traffic light amber illumination cycle of the remaining illumination time before the amber cycle ends and the red light illuminates, whereby the plurality of LED's 30 reset to a red timing cycle. The indicator 18 provides drivers 14 at an intersection 10 a finer gradient of light cycles time duration, thereby reducing the risk of accidents and increasing traffic flow due to a preparedness of event changes.

Figure 9:
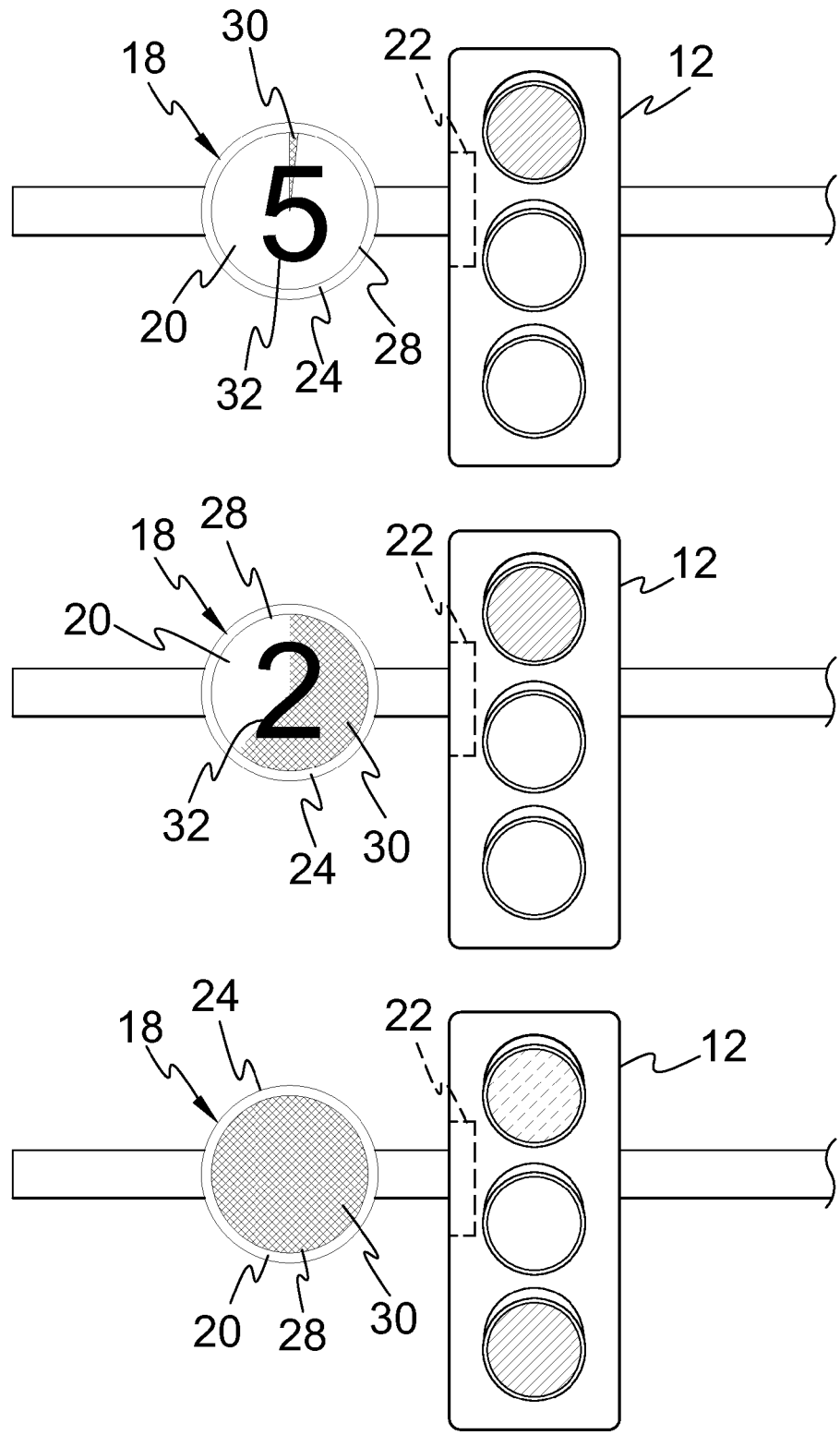
FIG. 9 is an illustrative view of the other configuration showing a red light sequence and progressive illumination of remaining cycle time.

Referring to FIG. 9, shown is an illustrative view of the other configuration showing a red light sequence and progressive illumination of remaining cycle time. Shown is the clock-like face 28 having a progression of illuminating LED's 30 that when fully illuminated or un-illuminated signals the end of the current illuminated light cycle, whereby the red light ends and the green light illuminates with the plurality of LED's 30 reset to a current illuminated light timing cycle. The indicator 18 provides drivers 14 at an intersection 10 granular information of an illuminated light cycle time between light cycle changes. Further provided is an additional element 32 wherein, the sweep of the LED's 30 from on to off or visa-versa displays a numeric count down to light cycle change.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A traffic light illumination duration indicator for a conventional traffic light comprising:
   a horizontal stanchion arm supporting a bank of green, amber and red traffic lights, said bank of traffic lights being in a vertical array extending from above to below said horizontal stanchion arm;
   mounted on said stanchion arm on the left of and adjacent to said bank of traffic lights is said duration indicator, and a built-in counter device in said bank of traffic lights, the indicator comprising a visual digital time display, wherein the display shows time intervals between light changes of the traffic light, to inform a driver of a motor vehicle time between light changes of the traffic light;
   said visual digital time display comprising a circular clock-like face having a plurality of LED's therein that illuminate in a progressive clockwise sweep filling said face with LED'S in substantial entirety with a radial line from an edge of said LED's separating illuminated and non-illuminated LED'S rotating around said face, indicating the amount of time until the traffic light changes from green to amber to red, said sweep covering a full face of said display from a central focal point to an outer rim thereof;
   wherein the visual digital time display further comprises a numeric display superimposed on and in the center of said progressive clockwise sweep wherein numerals in said numeric display countdown as said sweep progresses, said numerals substantially filling said circular clock-face; and
   wherein the visual digital time display comprises a weather resistant housing encapsulating digital components.

* * * * *